United States Patent [19]
Hefford

[11] Patent Number: 5,794,520
[45] Date of Patent: Aug. 18, 1998

[54] WATER HEATING VESSEL

[75] Inventor: David V. Hefford, Esher, Great Britain

[73] Assignee: U.S. Philips Corporation, New York, N.Y.

[21] Appl. No.: 818,141

[22] Filed: Mar. 13, 1997

[30] Foreign Application Priority Data

Mar. 20, 1996 [GB] United Kingdom ............... 9605831

[51] Int. Cl.⁶ .................. A23L 1/00; A21B 1/08; A47J 27/00; H05B 1/02
[52] U.S. Cl. .................. 99/323.3; 99/331; 99/403; 99/516; 219/401; 219/497; 219/501; 219/506; 126/20
[58] Field of Search .............. 99/281, 293, 275, 99/323.1, 323.3, 325–333, 337, 338, 403, 468, 486, 487, 516, 536; 126/369, 20, 374; 219/401, 497, 501, 506, 512, 392, 441, 494; 337/336, 348, 371; 392/447, 498; 426/231, 510, 523

[56] References Cited

U.S. PATENT DOCUMENTS

| | | | |
|---|---|---|---|
| 3,784,788 | 1/1974 | Fourny | 219/441 |
| 3,828,164 | 8/1974 | Fischer et al. | 219/431 |
| 4,017,277 | 4/1977 | Van Dyke, Sr. et al. | 126/350 R |
| 4,539,468 | 9/1985 | Phillips et al. | 392/447 |
| 4,752,671 | 6/1988 | Foster et al. | 219/512 X |
| 4,754,122 | 6/1988 | Coppier | 219/437 |
| 4,829,888 | 5/1989 | Webste et al. | 99/284 |
| 5,125,068 | 6/1992 | NcNair et al. | 126/374 X |
| 5,378,482 | 1/1995 | Kersten et al. | 426/231 |
| 5,410,129 | 4/1995 | Kersten et al. | 99/331 |
| 5,522,307 | 6/1996 | Kersten et al. | 99/331 |
| 5,557,704 | 9/1996 | Dennis et al. | 219/543 X |
| 5,635,092 | 6/1997 | O'Neil | 219/441 |

FOREIGN PATENT DOCUMENTS

| | | |
|---|---|---|
| 0595085A1 | 5/1994 | European Pat. Off. . |
| 3524698A1 | 1/1987 | Germany . |
| 91067510 U | 9/1991 | Germany . |

*Primary Examiner*—Timothy F. Simone
*Attorney, Agent, or Firm*—Robert J. Kraus; Ernestine C. Bartlett

[57] ABSTRACT

An electric kettle has a body (10) a flat heating element (16), a thermal sensor (32) located with its bimetallic part 34 located in a steam chamber (20) and its electrical parts (36, 38) located in a dry chamber sealed from the steam chamber by a canopy (30), and first and second chimneys (40, 42) below the steam chamber (20) and the dry chamber respectively and having their lower ends connected to a base enclosure (44) below the heating element, the enclosure (44) having apertures (48) on the opposite side of the kettle to the chimneys.

9 Claims, 1 Drawing Sheet

U.S. Patent   Aug. 18, 1998   5,794,520
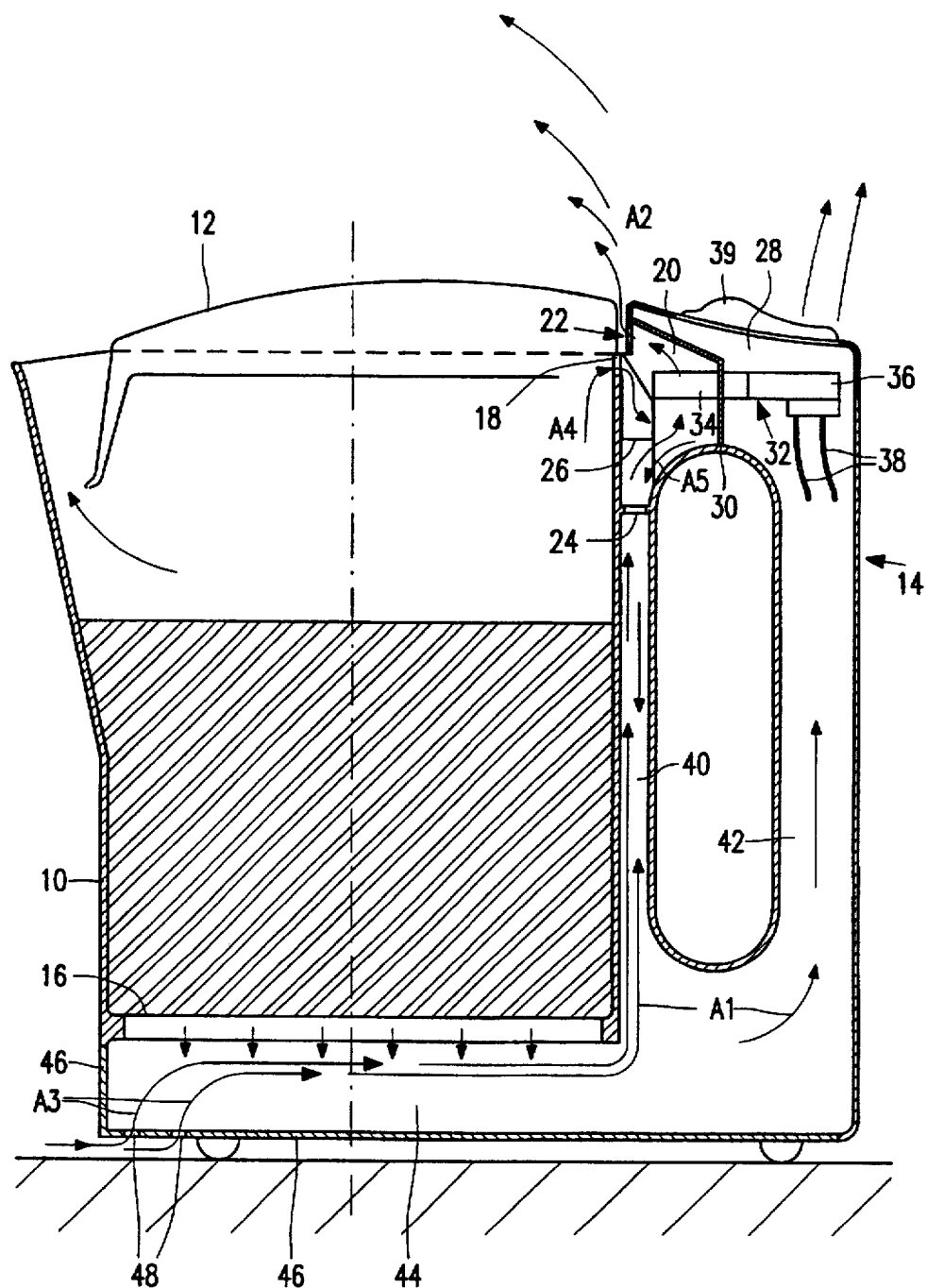

WATER HEATING VESSEL

BACKGROUND OF THE INVENTION

This invention relates to water heating vessels, for example electric kettles, especially to kettles having a thermal sensor to initiate automatic disconnection.

Many kettles have an automatic switch-off on boil, often a bi-metallic switch exposed to steam. It is an advantage if such a switch can be reset quickly, so that steam and condensate must be removed from the vicinity of the switch. Various drainage and venting arrangements are known to provide such removal but may not be completely effective.

Kettles are also known having a steam sensitive thermal sensor near the top of the kettle and which have a vertical passage below the steam chamber in which the thermal sensor is located, but reset may still be slow. An example of one such kettle is the kettle made by Swan with the brand name "Swan Gold Filter". Another problem which may be encountered in known kettles is that the electrical portions of the switch exposed to steam must be designed to withstand this exposure to moisture.

SUMMARY OF THE INVENTION

According to a first aspect of the invention a water heating vessel comprises a body portion, a heating element and a steam vent connecting the upper part of the body portion to a vented steam chamber, the vessel further comprising a dry chamber adjacent the steam chamber and separated from the steam chamber by moisture-proof divider means, a steam sensor being sealed into the divider means so that a thermally-sensitive part of the steam sensor is in the steam chamber and an electrical portion of the steam sensor is in the dry chamber.

Thus, the electrical portion of the steam sensor is protected from steam which enters the steam chamber to enable operation of the steam sensor.

Kettles are also known which have a heating element which forms the lower surface of the water vessel, in contrast to kettles in which the element is immersed in water and spaced above the kettle base. Such elements are known as flat elements, although in practice their upper surface in contact with the water may be corrugated, or curved upwards at the edges adjacent the kettle walls, or may even have a strong curvature such as a hemi-spherical upper surface. In such elements, the heating part may cover the whole surface, or a part, usually the central part, of the surface. In this specification, such elements will be referred to as "flat elements".

According to a second aspect of the invention, a water heating vessel comprises a body portion, a heating element, and a steam vent connecting the upper part of the body portion to a vented steam chamber, the heating element being a flat element as hereinbefore defined and the vessel further comprises a first chimney connected to the lower end of the steam chamber, the lower end of the chimney being connected to a base enclosure below the heating element, the base enclosure having at least one aperture positioned on an opposite side of the vessel to the first chimney.

As a flat element defines the base of the liquid receiving portion of the vessel, the side of the flat element opposite to the liquid receiving portion will radiate heat to the base enclosure.

Thus, in operation, air within the hollow base is heated by downwardly-radiated heat from the underside of the heating element, and warm air passes up the first chimney to the steam chamber sweeping steam from the steam chamber through its vent. Any condensate in the steam chamber can also drain downwards through the first chimney.

Preferably the steam chamber and the first chimney are located within the handle of the kettle.

The invention also provides a vessel which combines the two aspects of the invention. Optionally, in such a combination, the kettle further comprises a second chimney below the dry chamber and connected at its lower end to the base enclosure. When a second chimney is provided, air also passes up the second chimney to the dry chamber, keeping it dry.

It is an advantage of a kettle according to the first aspect of the invention that, when the steam sensor comprises a bimetallic sensor, only the bi-metallic part of the steam sensor is exposed to steam or condensate and the electrical parts of the steam sensor remain dry.

It is a further advantage of an electric kettle according to the second aspect of the invention that the reset time of the kettle is reduced as steam and any condensate are rapidly removed from the steam chamber.

BRIEF DESCRIPTION OF THE DRAWING

The invention will now be described by way of example only with reference to the accompanying drawing which is a vertical section through a kettle according to the invention.

DESCRIPTION OF THE PREFERRED EMBODIMENT

In the figure, a jug kettle has a hollow body 10, a lid 12, and a handle 14. The base of the body 10 comprises a flat heating element 16, which may be formed by a thick film or by brazed technology or by pressed-in technology or any other conventional technique.

At the upper part of the body 10 adjacent the handle 14 a steam vent 18 connects the body to a steam chamber 20 located in the upper part of the handle 14. The chamber 20 has an upper vent to air 22 located between the mouldings forming the handle 14 and the lid 12 and has also in its floor a drainage aperture 24 which is shielded by a lip 26 protruding from the wall of the chamber above the aperture.

Adjacent the steam chamber 20 and also within the handle 14 is a dry chamber 28, separated from the steam chamber 20 by a divider in the form of a steam canopy 30. The steam sensor 32 is sealed into the canopy and positioned so that its bi-metallic element 34 is within the steam chamber 20 and the electrical portion 36 and connecting wires 38 (shown schematically) are within the dry chamber 28 and sealed from the steam chamber. The electrical portion comprises an electrical switch which may be mechanically actuated by the bi-metallic element 34.

On the upper surface of the handle 14 there is a rocker switch 39 mechanically connected by means not shown to the steam sensor so as to operate manually the electrical switch of the steam sensor. The switch 39 may incorporate a neon indicator light, not shown.

Below the drainage aperture 24 of the steam chamber 20 there is a first chimney 40 within the part of the handle 14 adjacent the kettle body 10, and below the dry chamber 28 there is a second chimney 42 within the part of the handle 14 remote from the kettle body 10. Both chimneys are connected at the lower part of the handle to an enclosure 44 below the heating element 16 and enclosed by a base part 46. The base part has in its undersurface on the opposite side of the kettle to the chimneys two air vents 48.

In operation, the rocker switch 39 is pressed to close the electrical circuit via the steam sensor 32, and electric current is supplied to the heating element 16. As the upper surface of the element heats the water in the kettle, the lower surface of the element radiates heat to the air in the base enclosure 44; the heated air passes up the first and second chimneys 40, 42 as shown by the arrows A1 and through the steam chamber 20 to be vented as shown by the arrow A2. Unheated air is drawn through the air vents 48 in the base enclosure 44 as indicated by the arrows A3. When the water in the kettle boils, steam enters the steam chamber 20 through the steam vent 18 as shown by the arrow A4, and when the bimetallic element 34 reaches a pre-set temperature, it operates to disconnect the electric current from the heating element 16. The stream of warm dry air passing up the first chimney 40 is however maintained for some time, so that the steam in the steam chamber 20 is swept out through the vent 22; if any steam condenses in the steam chamber 20, it flows down through the drainage aperture 24 into the first chimney 40 as indicated by the arrow A5.

Although the steam chamber 20 will contain steam when the water in the kettle boils, the electrical portion 36 and the connecting wires, 38 of the steam sensor 32 are protected from moisture by the canopy 30, and remain dry at all times.

Although the invention has been described with reference to electric kettles, it may be applied to other electric water-heating devices where it is a requirement that the heating power is switched off when the water boils, or switched to a reduced level when the water reaches a required temperature, such as in the device known as a hot-pot which provides water at simmering temperature. Also, other types of steam sensor may be employed which include thermally-sensitive portions and electrical portions.

I claim:

1. A water heating vessel comprising a body portion (10), an electric heating element (16) and a steam vent (18) connecting the upper part of the body portion to a vented steam chamber (20), the vessel further comprising a dry chamber (28) adjacent the steam chamber (20) and separated from the steam chamber by moisture-proof divider means (30), a steam sensor being sealed into said divider means so that a thermally-sensitive part (34) of the steam sensor is in the steam chamber and an electrical portion (36, 38) of the steam sensor is in the dry chamber.

2. A water heating vessel comprising a body portion (10) for receiving water to be heated, an electric heating element (16) and a steam vent (18) connecting the upper part of the body portion to a vented steam chamber (20), the heating element (16) defining the base of the body portion (10), the vessel further comprising a first chimney (40) connected to the lower end of the steam chamber (20), the lower end of the chimney being connected to a base enclosure (44) positioned below the heating element (16), the base enclosure (44) having at least one aperture (48) positioned on an opposite side of the vessel to the first chimney (40).

3. A water heating vessel according to claim 2, in which the steam chamber (20) and the first chimney (40) are located within a handle (14) of the vessel.

4. A water heating vessel according to claim 2, further comprising a dry chamber (28) adjacent the steam chamber (20) and separated from the steam chamber by moisture-proof divider means (30), a steam sensor being sealed into said divider means so that a thermally-sensitive part (34) of the steam sensor is in the steam chamber and an electrical portion (36, 38) of the steam sensor is in the dry chamber.

5. A water heating vessel according to claim 4 further comprising a second chimney (42) below the dry chamber (28) and connected at its lower end to the base enclosure (44).

6. A water heating vessel as claimed in claim 1 wherein the steam sensor comprises a bi-metallic sensor, the thermally sensitive part comprising the bi-metallic element, and the electrical portion comprising a switch which is mechanically actuated by the bimetallic element.

7. A water heating vessel according to claim 3, further comprising a dry chamber (28) adjacent the steam chamber (20) and separated from the steam chamber by moisture-proof divider means (30), a steam sensor being sealed into said divider means so that a thermally-sensitive part (34) of the steam sensor is in the steam chamber and an electrical portion (36, 38) of the steam sensor is in the dry chamber.

8. A water heating vessel as claimed in claim 4, wherein the steam sensor comprises a bi-metallic sensor, the thermally sensitive part comprising the bi-metallic element, and the electrical portion comprising a switch which is mechanically actuated by the bimetallic element.

9. A water heating vessel as claimed in claim 5 wherein the steam sensor comprises a bi-metallic sensor, the thermally sensitive part comprising the bi-metallic element, and the electrical portion comprising a switch which is mechanically actuated by the bimetallic element.

* * * * *